United States Patent
Liu et al.

(10) Patent No.: US 11,412,413 B2
(45) Date of Patent: Aug. 9, 2022

(54) SERVICE FLOW OFFLOAD METHOD, NETWORK DEVICE, AND TERMINAL DEVICE

(71) Applicant: GUANGDONG OPPO MOBILE TELECOMMUNICATIONS CORP., LTD., Guangdong (CN)

(72) Inventors: Jianhua Liu, Guangdong (CN); Cong Shi, Guangdong (CN); Ning Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/897,200

(22) Filed: Jun. 9, 2020

(65) Prior Publication Data
US 2020/0305025 A1    Sep. 24, 2020

Related U.S. Application Data (63) Continuation of application No. PCT/CN2017/117844, filed on Dec. 21, 2017.

(51) Int. Cl.
*H04W 28/08* (2009.01)
*H04W 16/14* (2009.01)
*H04W 84/04* (2009.01)

(52) U.S. Cl.
CPC ......... *H04W 28/085* (2013.01); *H04W 16/14* (2013.01); *H04W 84/042* (2013.01)

(58) Field of Classification Search
CPC .............. H04W 16/14; H04W 28/0819; H04W 28/085; H04W 72/04; H04W 84/042
See application file for complete search history.

(56) References Cited

U.S. PATENT DOCUMENTS

2014/0044105 A1    2/2014  Bontu et al.
2015/0341830 A1*  11/2015  Jeong ................ H04W 28/0268
                                                     370/329
(Continued)

FOREIGN PATENT DOCUMENTS

| CN | 105451274 A | 3/2016 |
| CN | 106358238 A | 1/2017 |

(Continued)

OTHER PUBLICATIONS

International Search Report dated Sep. 28, 2018 of PCT/CN2017/117844 (4 pages).

(Continued)

*Primary Examiner* — Kibrom T Hailu
*Assistant Examiner* — Nizam U Ahmed
(74) *Attorney, Agent, or Firm* — Perkins Coie LLP (57) ABSTRACT

Implementations of the present disclosure provide a service distribution method, a network device, and a terminal device. The method is applied to a 5G communications system and comprises: after a terminal device accesses a first network, a network device determining control information according to first information, wherein the control information is used to control the terminal device to perform service distribution in a licensed spectrum and an unlicensed spectrum, the first network is a licensed network and/or an unlicensed network, and the first information is a PDU session, a QoS flow, or a DRB; and the network device sending the control information to the terminal device.

18 Claims, 4 Drawing Sheets

(56) References Cited

U.S. PATENT DOCUMENTS

| | | | | |
|---|---|---|---|---|
| 2016/0174078 | A1* | 6/2016 | Salem | H04W 16/14 |
| | | | | 370/329 |
| 2016/0345334 | A1* | 11/2016 | Veerepalli | H04W 48/08 |
| 2017/0034756 | A1 | 2/2017 | Faccin et al. | |
| 2017/0303236 | A1* | 10/2017 | Sun | H04W 76/28 |
| 2017/0318594 | A1 | 11/2017 | Babaei et al. | |
| 2020/0059983 | A1* | 2/2020 | Stauffer | H04W 36/0066 |
| 2021/0160729 | A1* | 5/2021 | Agiwal | H04W 28/0268 |

FOREIGN PATENT DOCUMENTS

| | | | |
|---|---|---|---|
| CN | 107005999 | A | 8/2017 |
| EP | 3086589 | A1 | 10/2016 |
| JP | 2017519425 | A | 7/2017 |
| WO | 2015178747 | A1 | 11/2015 |
| WO | 2017132976 | A1 | 8/2017 |

OTHER PUBLICATIONS

3GPP TS 23.501 V1.0.0 (Jun. 2017)—3rd Generation Partnership Project; Technical Specification Group Services and System Aspects; System Architecture for the 5G System; Stage 2 (Release 15) (145 pages).
3GPP TS 23.502 V1.0.0 (Sep. 2017)—3rd Generation Partnership Project Technical Specification Group Services and System Aspects; Procedures for the 5G System; Stage 2 (Release 15) (165 pages).
Supplementary European Search Report dated Oct. 15, 2020 of European Patent Application No. 17935233.1 (8 pages).
Examination Report for Indian Application No. 202017029170 dated Sep. 3, 2021. 5 pages with English translation.
Notice of Reasons for Refusal for Japanese Application No. 2020-532970 dated Jan. 4, 2022. 4 pages with English translation.
Examination Report for European Application No. 17935233.1 dated Apr. 21, 2022. 7 pages.

* cited by examiner

A terminal device receives control information sent by a network device and determined according to first information after the terminal device accesses a first network, wherein the control information is used for controlling the terminal device to perform service flow offload in a licensed spectrum and an unlicensed spectrum, the first network is a licensed network and/or an unlicensed network, and the first information is a PDU session, a QoS flow, or a DRB ~ 310

The terminal device performs the service flow offload in the licensed spectrum and the unlicensed spectrum according to the control information ~ 320

SERVICE FLOW OFFLOAD METHOD, NETWORK DEVICE, AND TERMINAL DEVICE

This application is a continuation application of International Application No. PCT/CN2017/117844 filed on Dec. 21, 2017, and the entire disclosure of the application is hereby incorporated by reference.

TECHNICAL FIELD

The present disclosure relates to the communication field, and more particularly, to a service flow offload method, a network device and a terminal device.

BACKGROUND

The 5th Generation mobile communication technology New Radio (5G NR) can operate in licensed or unlicensed spectrums, but there is no mechanism in which the terminal device selects and service flow offload is performed for licensed and unlicensed spectrums.

SUMMARY

Implementations of the present disclosure provide a service flow offload method, a network device, and a terminal device.

In a first aspect, an implementation of the present disclosure provides a service flow offload method, applied to a 5G (5th Generation mobile communication technology) communication system. The method includes: determining, by a network device, control information according to first information after a terminal device accesses a first network, wherein the control information is used for controlling the terminal device to perform service flow offload in a licensed spectrum and an unlicensed spectrum, the first network is a licensed network and/or an unlicensed network, and the first information is a packet data unit (PDU) session, a quality of service (QoS) flow, or a data radio bearer (DRB); and sending, by the network device, the control information to the terminal device. Therefore, in a service flow offload method of an implementation of the present disclosure, a network device determines control information according to a PDU session, QoS flow, or DRB, so that a terminal device implements service flow offload in a licensed spectrum and an unlicensed spectrum.

Optionally, in one implementation of the first aspect, before the terminal device accesses the first network, the method further includes: sending, by the network device, first configuration information to the terminal device, wherein the first configuration information is used for indicating priority information of the licensed network and the unlicensed network, and the priority information is used for the terminal device to select one from the licensed network and the unlicensed network to access.

Optionally, in one implementation of the first aspect, before the terminal device accesses the first network, the method further includes: sending, by the network device, second configuration information to the terminal device according to QoS requirement of a service and/or user subscription information, wherein the second configuration information is used for indicating a corresponding relationship between the QoS requirement of the service and/or the user subscription information and the licensed network and the unlicensed network.

Optionally, in one implementation of the first aspect, a mode for the terminal device to access the first network is a standalone mode or a non-standalone mode, wherein the standalone mode means that the terminal device implements a primary cell function and a secondary cell function on the unlicensed spectrum, and the non-standalone mode means that the terminal device implements the secondary cell function on the unlicensed spectrum.

Optionally, in one implementation of the first aspect, if the first information is the PDU session, the network device is a core network device, and the control information is specifically used for controlling the terminal device to perform the service flow offload in the licensed spectrum and the unlicensed spectrum for different PDU sessions.

Optionally, in one implementation of the first aspect, the core network device is an access and mobility management function (AMF) device or a user plane function (UPF) device, wherein the licensed spectrum and the unlicensed spectrum correspond to a same AMF device, and the licensed spectrum and the unlicensed spectrum correspond to different UPF devices.

Optionally, in one implementation of the first aspect, if the first information is the QoS flow, the network device is a core network device, and the control information is specifically used for controlling the terminal device to perform the service flow offload in the licensed spectrum and the unlicensed spectrum for different QoS flows in a same PDU session.

Optionally, in one implementation of the first aspect, the core network device is an AMF device, wherein the licensed spectrum and the unlicensed spectrum correspond to a same core network device.

Optionally, in one implementation of the first aspect, if the first information is a DRB, the network device is an access network device, and the mode for the terminal device to access the first network is a non-standalone mode, and the control information is specifically used for controlling the terminal device to perform the service flow offload in the licensed spectrum and the unlicensed spectrum for different DRBs.

Optionally, in one implementation of the first aspect, before the network device determines the control information according to the first information, the method further includes: receiving, by the access network device, first indication information sent by a core network device or the terminal device, wherein the first indication information indicates that a DRB for the terminal device is distributed to the licensed spectrum and the unlicensed spectrum. Determining, by the network device, the control information according to the first information, includes: determining, by the access network device, the control information according to the first indication information.

Optionally, in one implementation of the first aspect, before the network device determines the control information according to the first information, the method further includes: receiving, by the access network device, second indication information sent by a core network device, wherein the second indication information indicates that a service is flow offloaded to the licensed spectrum and the unlicensed spectrum according to a 5G QoS identifier (5QI) or a QoS flow identifier (QFI); and determining, by the access network device, a constraint condition for offloading the DRB to the licensed spectrum and the unlicensed spectrum according to the second indication information.

Determining, by the network device, the control information according to the first information, includes: determining, by the access network device, the control information according to the constraint condition.

In a second aspect, an implementation of the present disclosure provides a service flow offload method, applied to a 5G communication system. The method includes: receiving, by a terminal device, control information sent by a network device and determined according to first information after the terminal device accesses a first network, wherein the control information is used for controlling the terminal device to perform service flow offload in a licensed spectrum and an unlicensed spectrum, the first network is a licensed network and/or an unlicensed network, and the first information is a PDU session, a QoS flow, or a DRB; and performing, by the terminal device, the service flow offload in the licensed spectrum and the unlicensed spectrum according to the control information.

Optionally, in one implementation of the second aspect, before the terminal device accesses the first network, the method further includes: receiving, by the terminal device, first configuration information sent by the network device, wherein the first configuration information is used for indicating priority information of the licensed network and the unlicensed network, and the priority information is used for the terminal device to select one from the licensed network and the unlicensed network to access; determining, by the terminal device, according to the first configuration information, network identification information of a network that is needed to be accessed and/or system information of the network that is needed to be accessed for initial access, attachment and registration; and accessing, by the terminal device, the first network according to the network identification information of the network that is needed to be accessed and/or the system information of the network that is needed to be accessed for initial access, attachment and registration.

Optionally, in one implementation of the second aspect, before the terminal device accesses the first network, the method further includes: receiving, by the terminal device, second configuration information sent by the network device, wherein the second configuration information is used for indicating a corresponding relationship between QoS requirement of a service and/or user subscription information and the licensed network and the unlicensed network; and accessing, by the terminal device, the first network according to QoS requirement of a service that need be transmitted and/or the user subscription information, and the corresponding relationship between the QoS requirement of the service and/or the user subscription information and the licensed network and the unlicensed network.

Optionally, in one implementation of the second aspect, a mode for the terminal device to access the first network is a standalone mode or a non-standalone mode, wherein the standalone mode means that the terminal device implements a primary cell function and a secondary cell function on the unlicensed spectrum, and the non-standalone mode means that the terminal device implements the secondary cell function on the unlicensed spectrum.

Optionally, in one implementation of the second aspect, if the first information is the PDU session, the network device is a core network device, and the control information is specifically used for controlling the terminal device to perform the service flow offload in the licensed spectrum and the unlicensed spectrum for different PDU sessions.

Performing, by the terminal device, the service flow offload in the licensed spectrum and the unlicensed spectrum according to the control information includes: performing, by the terminal device, the service flow offload in the licensed spectrum and the unlicensed spectrum for different PDU sessions according to the control information.

Optionally, in one implementation of the second aspect, the core network device is an AMF device or a UPF device, wherein the licensed spectrum and the unlicensed spectrum correspond to a same AMF device, and the licensed spectrum and the unlicensed spectrum correspond to different UPF devices.

Optionally, in one implementation of the second aspect, if the first information is the QoS flow, the network device is a core network device, and the control information is specifically used for controlling the terminal device to perform the service flow offload in the licensed spectrum and the unlicensed spectrum for different QoS flows in a same PDU session.

Performing, by the terminal device, the service flow offload in the licensed spectrum and the unlicensed spectrum according to the control information includes: performing, by the terminal device, the service flow offload in the licensed spectrum and the unlicensed spectrum for different QoS flows in a same PDU session according to the control information.

Optionally, in one implementation of the second aspect, the core network device is an AMF device, wherein the licensed spectrum and the unlicensed spectrum correspond to a same core network device.

Optionally, in one implementation of the second aspect, if the first information is a DRB, the network device is an access network device, and the mode for the terminal device to access the first network is a non-standalone mode, and the control information is specifically used for controlling the terminal device to perform the service flow offload in the licensed spectrum and the unlicensed spectrum for different DRBs.

Performing, by the terminal device, the service flow offload in the licensed spectrum and the unlicensed spectrum according to the control information includes: performing, by the terminal device, the service flow offload in the licensed spectrum and the unlicensed spectrum for different DRBs according to the control information.

In a third aspect, an implementation of the present disclosure provides a network device that may execute modules or units of the method in the first aspect or any alternative implementation of the first aspect.

In a fourth aspect, an implementation of the present disclosure provides a terminal device that may execute modules or units of the method in the second aspect or any alternative implementation of the second aspect.

In a fifth aspect, a network device is provided, and the network device includes a processor, a memory, and a communication interface. The processor is connected with the memory and the communication interface. The memory is used for storing instructions, and the processor is used for executing the instructions, and the communication interface is used for communicating with other network elements under the control of the processor. When the processor executes the instructions stored in the memory, the execution causes the processor to execute the method in the first aspect or any possible implementation of the first aspect.

In a sixth aspect, a terminal device is provided, and the terminal device includes a processor, a memory, and a communication interface. The processor is connected with the memory and the communication interface. The memory is used for storing instructions, and the processor is used for executing the instructions, and the communication interface is used for communicating with other network elements under the control of the processor. When the processor executes the instructions stored in the memory, the execution causes the processor to execute the method in the second aspect or any possible implementation of the second aspect.

In a seventh aspect, a computer storage medium is provided, and the computer storage medium stores a program code for indicating a computer to execute instructions of the methods described in the above various aspects.

In an eighth aspect, a computer program product including instructions is provided, when running on a computer, the instructions cause the computer to execute the methods described in the above various aspects.

DETAILED DESCRIPTION

Technical solutions in implementations of the present disclosure will be clearly and completely described below with reference to the drawings in the implementations of the present disclosure.

The technical schemes of the implementations of the present disclosure may be applied to a 5G NR communication system.

Figure 1:
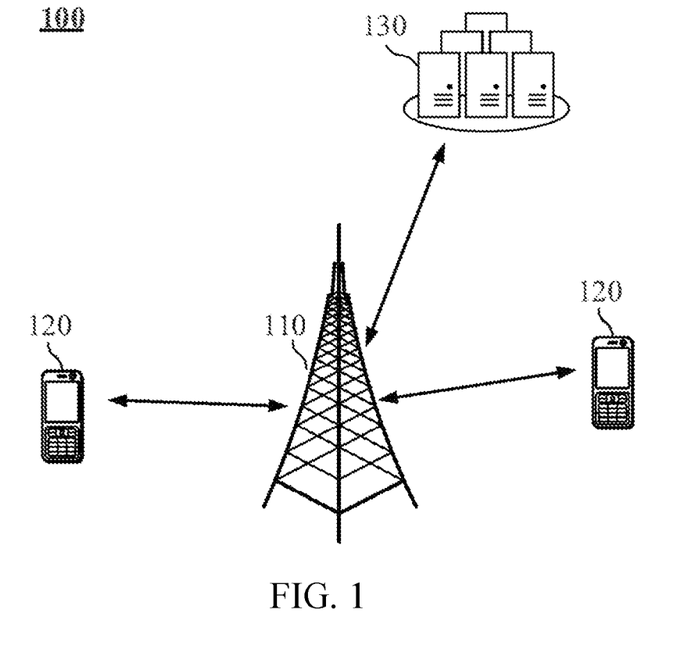
FIG. 1 shows a wireless communication system to which implementations of the present disclosure are applied.

FIG. 1 shows a wireless communication system 100 to which an implementation of the present disclosure is applied. The wireless communication system 100 may include a base station 110. The base station 110 may be a device that communicates with a terminal device. The base station 110 may provide a communication coverage for a specific geographic area and may communicate with the terminal device (e.g., UE) located within the coverage area. Optionally, the base station 110 may be a base station (gNB) in an NR system, or a radio controller in a Cloud Radio Access Network (CRAN), or the network device may be a relay station, an access point, an on-board device, a wearable device, or a network device in a Public Land Mobile Network (PLMN) to be evolved in the future, etc.

The wireless communication system 100 further includes at least one terminal device 120 located within a coverage range of the base station 110. The terminal device 120 may be mobile or fixed. Optionally, the terminal device 120 may be referred to as an access terminal, a User Equipment (UE), a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or other processing device connected to a wireless modem, a vehicle-mounted device, a wearable device, a terminal device in a future 5G network, or a terminal device in a future evolved Public Land Mobile Network (PLMN), or the like.

The wireless communication system 100 further includes a core network device 130 that communicates with a base station. The core network device 130 may be a 5G core (5GC) network device, for example, an Access and Mobility Management Function (AMF), an Authentication Server Function (AUSF), or a User Plane Function (UPF).

Optionally, in an implementation of the present disclosure, the terminal device can obtain user subscription information of a terminal device from the UPF.

FIG. 1 exemplifies a base station, a core network device and two terminal devices. Optionally, the wireless communication system 100 may include a plurality of base station devices, and other quantity of terminal devices may be included in a coverage range of each base station, which is not limited by an implementation of the present disclosure.

Optionally, the wireless communication system 100 may also include other network entities, such as Session Management Function (SMF), Unified Data Management (UDM), or Authentication Server Function (AUSF), which is not limited by the implementation of the present disclosure.

It should be understood that the terms "system" and "network" are often used interchangeably in this document. The term "and/or" in this document is merely an association relationship describing associated objects, indicating that there may be three relationships, for example, A and/or B may indicate three cases: A alone, A and B, and B alone. In addition, the symbol "/" in this document generally indicates that objects before and after the symbol "/" have an "or" relationship.

Figure 2:
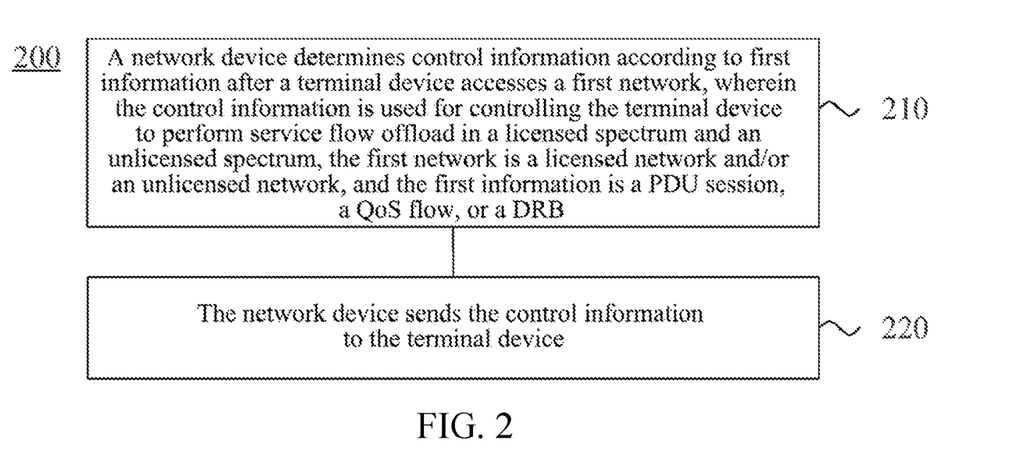
FIG. 2 is a schematic flowchart of a service flow offload method according to an implementation of the present disclosure.

FIG. 2 is a schematic flowchart of a service flow offload method 200 according to an implementation of the present disclosure. The method 200 may optionally be applied to the system shown in FIG. 1, but is not limited thereto. The method 200 is applied to a 5G communication system, and the method 200 includes at least some of the following contents.

210. A network device determines control information according to first information after a terminal device accesses a first network, wherein the control information is used for controlling the terminal device to perform service flow offload in a licensed spectrum and an unlicensed spectrum, the first network is a licensed network and/or an unlicensed network, and the first information is a PDU session, a QoS flow, or a DRB.

220. The network device sends the control information to the terminal device.

Optionally, the terminal device has both licensed and unlicensed radio interfaces, i.e., an NR licensed radio interface and an NR unlicensed radio interface.

The NR licensed radio interface can transmit data with an access network device through air interface connection, that is, the NR licensed radio interface can establish a direct logical channel with the access network device. The NR unlicensed radio interface does not transmit data directly with the access network device, but transmits data through an air interface which supports unlicensed spectrum (e.g., a WLAN protocol, or other protocols on an unlicensed spectrum including an NR protocol on an unlicensed spectrum).

Optionally, a mode for the terminal device to access the first network is a standalone (SA) mode or a non-standalone (NSA) mode, wherein the standalone mode means that the terminal device implements a primary cell (PCell) function and a secondary cell (SCell) function on the unlicensed spectrum, and the non-standalone mode means that the terminal device implements the secondary cell function on the unlicensed spectrum.

Figure 3:
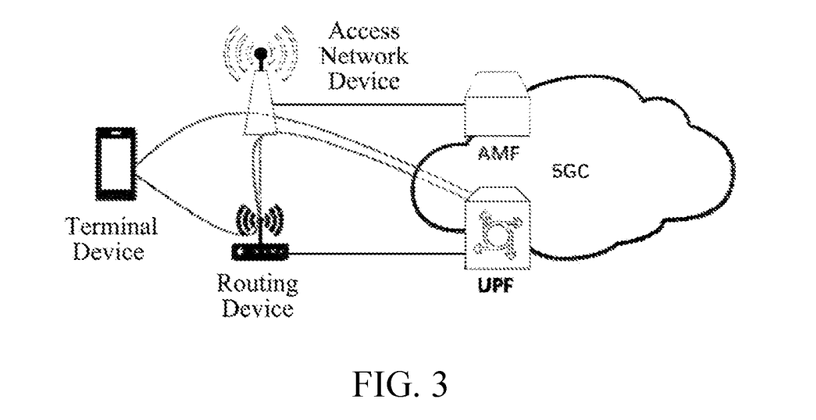
FIG. 3 is a schematic flowchart of a service flow offload method according to another implementation of the present disclosure.

Specifically, as shown in FIG. 3, the terminal device accesses the licensed network and/or the unlicensed network through the non-standalone (NSA) mode, the terminal device accesses the licensed network through an access network device (e.g., a gNB), and accesses the unlicensed network through a routing device. The terminal device can transfer some or all of the services to the licensed spectrum, and can also transfer some or all of the services to the unlicensed spectrum. The terminal device is directly connected to a core (5GC) network device such as an AMF and UPF through the access network device. The terminal device cannot be directly connected with the core (5GC) network device through a routing device. The terminal device firstly accesses the routing device, then the routing device accesses the access network device, and then the access network device connects with the core (5GC) network device such as the AMF and UPF.

For example, a service with high QoS requirement is transferred to the licensed spectrum, and a service with low QoS requirement is transferred to the unlicensed spectrum.

For another example, a service for a PDU session in the licensed spectrum is transferred to the licensed spectrum, and a service for a PDU session in the unlicensed spectrum is transferred to the unlicensed spectrum.

For another example, a service for a DRB in the licensed spectrum is transferred to the licensed spectrum, and a service for a DRB in the unlicensed spectrum is transferred to the unlicensed spectrum.

Figure 4:
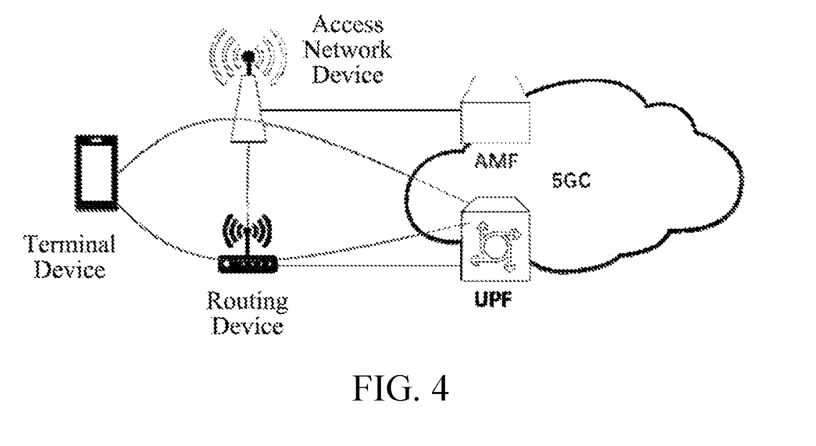
FIG. 4 is a schematic diagram of a terminal device accessing a licensed network/unlicensed network according to an implementation of the present disclosure.

Specifically, as shown in FIG. 4, the terminal device accesses the licensed network and/or the unlicensed network through the standalone (SA) mode, the terminal device accesses the licensed network through an access network device (gNB) and accesses the unlicensed network through a routing device. The terminal device can transfer some or all of the services to the licensed spectrum, and can also transfer some or all of the services to the unlicensed spectrum. The terminal device is directly connected to a core (5GC) network device such as an AMF and UPF through the access network device. The terminal device is directly connected to a core (5GC) network device such as an AMF and UPF through the routing device.

For example, a service with high QoS requirement is transferred to the licensed spectrum, and a service with low QoS requirement is transferred to the unlicensed spectrum.

For another example, a service for a PDU session in the licensed spectrum is transferred to the licensed spectrum, and a service for a PDU session in the unlicensed spectrum is transferred to the unlicensed spectrum.

For another example, a service for a DRB in the licensed spectrum is transferred to the licensed spectrum, and a service for a DRB in the unlicensed spectrum is transferred to the unlicensed spectrum.

Specifically, for the network device, if the first information is a PDU session, the network device is a core network device. For example, the core network device is an AMF device or a UPF device, the licensed spectrum and the unlicensed spectrum correspond to a same AMF device (i.e., a AMF device corresponding to the licensed spectrum is the same as that corresponding to the unlicensed spectrum), and the licensed spectrum and the unlicensed spectrum correspond to different UPF devices.

Optionally, the control information is specifically used for controlling the terminal device to perform the service flow offload in the licensed spectrum and the unlicensed spectrum for different PDU sessions.

Specifically, for the network device, if the first information is a QoS flow, the network device is a core network device. For example, the core network device is an AMF device, the licensed spectrum and the unlicensed spectrum correspond to a same core network device (i.e., the licensed spectrum and the unlicensed spectrum correspond to a same AMF device).

Optionally, the control information is specifically used for controlling the terminal device to perform the service flow offload in the licensed spectrum and the unlicensed spectrum for different QoS flows in a same PDU session.

Specifically, for the network device, if the first information is a DRB, the network device is an access network device, and a mode for the terminal device to access the first network is a non-standalone mode.

Optionally, the control information is specifically used for controlling the terminal device to perform the service flow offload in the licensed spectrum and the unlicensed spectrum for different DRBs.

Specifically, the network device can determine control information according to the following modes:

In mode 1, the access network device receives first indication information sent by a core network device or the terminal device, wherein the first indication information indicates that a DRB for the terminal device is offloaded to the licensed spectrum and the unlicensed spectrum.

The access network device determines the control information according to the first indication information.

Preferably, the access network device receives the first indication information sent by the core network device.

The access network device receives the first indication information that is sent by the core network device or the terminal device and indicates to offload the DRB for the terminal device to the licensed spectrum and the unlicensed spectrum, so that the access network device can determine the control information used for controlling the terminal device to perform the service flow offload in the licensed spectrum and the unlicensed spectrum for different DRBs.

In mode 2, the access network device receives second indication information sent by a core network device, wherein the second indication information indicates that a service is offloaded to the licensed spectrum and the unlicensed spectrum according to a 5QI or a QFI.

The access network device determines a constraint condition for offloading the DRB to the licensed spectrum and the unlicensed spectrum according to the second indication information.

The access network device determines the control information according to the constraint condition.

The access network device receives the second indication information that is sent by the core network device and indicates to offload the service to the licensed spectrum and the unlicensed spectrum according to the 5QI or the QFI, so that the access network device can determine the control information used for controlling the terminal device to perform the service flow offload in the licensed spectrum and the unlicensed spectrum for different DRBs.

Optionally, before the terminal device accesses the first network, the method 200 further includes: sending, by the network device, first configuration information to the terminal device, wherein the first configuration information is used for indicating priority information of the licensed network and the unlicensed network, and the priority information is used for the terminal device to select one from the licensed network and the unlicensed network to access. Therefore, in a service flow offload method of an embodiment of the present application, a network device configures priority information indicating priority information of access that a terminal device selects in a licensed network and an unlicensed network, so that the terminal device can access the licensed network and the unlicensed network.

Optionally, the first configuration information may be indicated explicitly or implicitly.

For example, the first configuration information explicitly indicates that the terminal device preferentially accesses the licensed network. For example, there are three accessible networks, denoted S1, S2, and S3, respectively, where S1 is a licensed network, and S2 and S3 are unlicensed networks. The terminal device preferentially accesses S1 and then randomly accesses S2 or S3 according to the first configuration information.

For another example, the first configuration information explicitly indicates that the terminal device preferentially accesses the unlicensed network. For example, there are three accessible networks, denoted S1, S2, and S3 respectively, where S1 is a licensed network and S2 and S3 are unlicensed networks, and the terminal device preferentially accesses S2 or S3 and finally accesses S1 according to the first configuration information.

For another example, the network device indicates a grouping order of a licensed network and an unlicensed network. The first configuration information implicitly indicates the network to which the terminal device preferentially accesses. For example, when there is only one accessible network, the network is accessed by default. When there are multiple accessible networks, the networks are accessed in the grouping order of the licensed network and the unlicensed network by default. For example, there are three accessible networks, denoted S1, S2 and S3 respectively, S1 is a licensed network, S2 and S3 are unlicensed networks, and their grouping order is S1, S2 and S3 in sequence. The terminal device preferentially accesses S1, then accesses S2 and finally accesses S3 according to the first configuration information.

Specifically, the first configuration information explicitly or implicitly indicates the terminal device to access the licensed network, or the first configuration information explicitly or implicitly indicates the terminal device to access the unlicensed network, or the first configuration information explicitly or implicitly indicates the terminal device to access both the licensed network and the unlicensed network.

Optionally, the terminal device determines, according to the first configuration information, network identification information of a network that is needed to be accessed and/or system information of the network that is needed to be accessed for initial access, attachment and registration.

The terminal device accesses the first network according to the network identification information of the network that is needed to be accessed and/or the system information of the network that is needed to be accessed for initial access, attachment and registration.

The network device configuration indicates priority information of access that the terminal device selects in the licensed network and the unlicensed network, so that the terminal device can access the licensed network and the unlicensed network.

Optionally, before the terminal device accesses the first network, the method 200 further includes: sending, by the network device, second configuration information to the terminal device according to QoS requirement of a service and/or user subscription information, wherein the second configuration information is used for indicating a corresponding relationship between the QoS requirement of the service and/or the user subscription information and the licensed network and the unlicensed network. Therefore, in a service flow offload method of an embodiment of the present application, network device configuration indicates a corresponding relationship between QoS requirement of a service and/or user subscription information and a licensed network and an unlicensed network, so that a terminal device can access the licensed network and the unlicensed network.

Optionally, the terminal device accesses the first network according to QoS requirement of a service that need be transmitted and/or the user subscription information, and the corresponding relationship between the QoS requirement of the service and/or the user subscription information and the licensed network and the unlicensed network.

The network device configuration indicates the corresponding relationship between the QoS requirement of the service and/or the user subscription information and the licensed network and the unlicensed network, so that the terminal device can access the licensed network and the unlicensed network.

Optionally, the first configuration information and the second configuration information may be configured when the terminal device is initially powered, or may be dynamically configured during use of the terminal device, which is not limited in the implementation of the present disclosure.

Therefore, in a service flow offload method of an implementation of the present disclosure, a network device determines control information according to a PDU session, or QoS flow, or DRB, so that a terminal device implements service flow offload in a licensed spectrum and an unlicensed spectrum.

Figure 5:
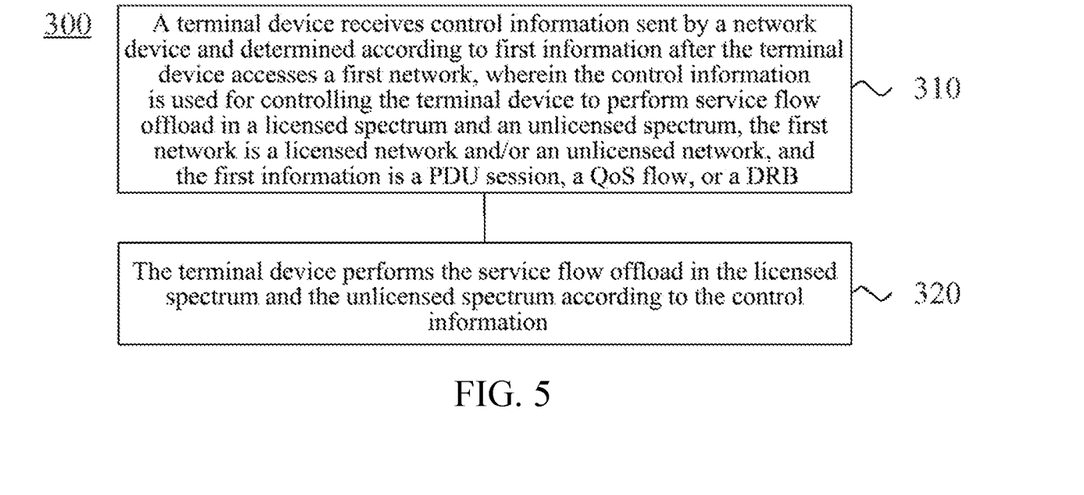
FIG. 5 is a schematic diagram of another terminal device accessing a licensed network/unlicensed network according to an implementation of the present disclosure.

FIG. 5 is a schematic flowchart of a service flow offload method 300 according to an implementation of the present disclosure. The method 300 may optionally be applied to the system shown in FIG. 1, but is not limited thereto. The method is applied to a 5G communication system, and the method 300 includes at least some of the following contents.

310. A terminal device receives control information sent by a network device and determined according to first information after the terminal device accesses a first network, wherein the control information is used for controlling the terminal device to perform service flow offload in a licensed spectrum and an unlicensed spectrum, the first network is a licensed network and/or an unlicensed network, and the first information is a PDU session, a QoS flow, or a DRB.

320. The terminal device performs the service flow offload in the licensed spectrum and the unlicensed spectrum according to the control information.

Optionally, before the terminal device accesses the first network, the method further includes: receiving, by the terminal device, first configuration information sent by the network device, wherein the first configuration information is used for indicating priority information of the licensed network and the unlicensed network, and the priority information is used for the terminal device to select one from the licensed network and the unlicensed network to access; determining, by the terminal device, according to the first configuration information, network identification information of a network that is needed to be accessed and/or system information of the network that is needed to be accessed for initial access, attachment and registration; and accessing, by the terminal device, the first network according to the network identification information of the network that is needed to be accessed and/or the system information of the network that is needed to be accessed for initial access, attachment and registration.

Optionally, before the terminal device accesses the first network, the method further includes: receiving, by the terminal device, second configuration information sent by the network device, wherein the second configuration information is used for indicating a corresponding relationship between QoS requirement of a service and/or user subscription information and the licensed network and the unlicensed network; and accessing, by the terminal device, the first network according to QoS requirement of a service that need be transmitted and/or the user subscription information, and the corresponding relationship between the QoS requirement of the service and/or the user subscription information and the licensed network and the unlicensed network.

Optionally, a mode for the terminal device to access the first network is a standalone mode or a non-standalone mode, wherein the standalone mode means that the terminal device implements a primary cell function and a secondary cell function on the unlicensed spectrum, and the non-standalone mode means that the terminal device implements the secondary cell function on the unlicensed spectrum.

Optionally, if the first information is the PDU session, the network device is a core network device, and the control information is specifically used for controlling the terminal device to perform the service flow offload in the licensed spectrum and the unlicensed spectrum for different PDU sessions.

Performing, by the terminal device, the service flow offload in the licensed spectrum and the unlicensed spectrum according to the control information includes: performing, by the terminal device, the service flow offload in the licensed spectrum and the unlicensed spectrum for different PDU sessions according to the control information.

Optionally, the core network device is an access and mobility management function (AMF) device or a user plane function (UPF) device, wherein the licensed spectrum and the unlicensed spectrum correspond to a same AMF device, and the licensed spectrum and the unlicensed spectrum correspond to different UPF devices.

Optionally, if the first information is the QoS flow, the network device is a core network device, and the control information is specifically used for controlling the terminal device to perform the service flow offload in the licensed spectrum and the unlicensed spectrum for different QoS flows in a same PDU session.

Performing, by the terminal device, the service flow offload in the licensed spectrum and the unlicensed spectrum according to the control information includes: performing, by the terminal device, the service flow offload in the licensed spectrum and the unlicensed spectrum for different QoS flows in a same PDU session according to the control information.

Optionally, the core network device is an AMF device, wherein the licensed spectrum and the unlicensed spectrum correspond to a same core network device.

Optionally, if the first information is a DRB, the network device is an access network device, and the mode for the terminal device to access the first network is a non-standalone mode, and the control information is specifically used for controlling the terminal device to perform the service flow offload in the licensed spectrum and the unlicensed spectrum for different DRBs.

Performing, by the terminal device, the service flow offload in the licensed spectrum and the unlicensed spectrum according to the control information includes: performing, by the terminal device, the service flow offload in the licensed spectrum and the unlicensed spectrum for different DRBs according to the control information.

It should be understood that the acts in the service flow offload method 300 may refer to the relevant description of the corresponding acts in the service flow offload method 200, and will not be repeated here for the sake of brevity.

Therefore, in a service flow offload method of an implementation of the present disclosure, a network device determines control information according to a PDU session, or QoS flow, or DRB, so that a terminal device implements service flow offload in a licensed spectrum and an unlicensed spectrum.

Figure 6:
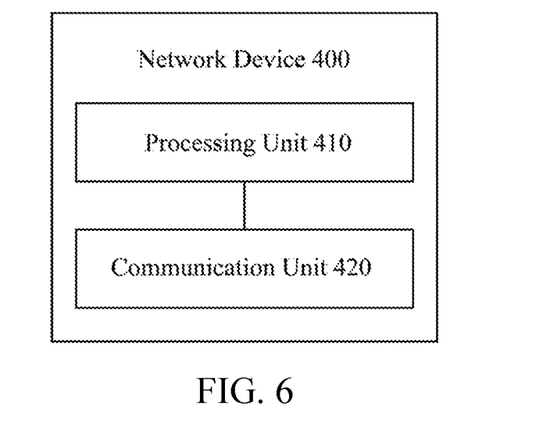
FIG. 6 is a schematic block diagram of a network device according to an implementation of the present disclosure.

FIG. 6 is a schematic block diagram of a network device 400 according to an implementation of the present disclosure. As shown in FIG. 6, the network device 400 is applied to a 5G communication system, and the network device 400 includes: a processing unit 410 and a communication unit 420.

The processing unit 410 is configured to determine control information according to first information after a terminal device accesses a first network, wherein the control information is used for controlling the terminal device to perform service flow offload in a licensed spectrum and an unlicensed spectrum, the first network is a licensed network and/or an unlicensed network, and the first information is a packet data unit (PDU) session, a quality of service (QoS) flow, or a data radio bearer (DRB).

The communication unit 420 is configured to send the control information to the terminal device.

Optionally, before the terminal device accesses the first network, the communication unit 420 is further configured to send first configuration information to the terminal device, wherein the first configuration information is used for indicating priority information of the licensed network and the unlicensed network, and the priority information is used for the terminal device to select one from the licensed network and the unlicensed network to access.

Optionally, before the terminal device accesses the first network, the communication unit 420 is further configured to send second configuration information to the terminal device according to QoS requirement of a service and/or user subscription information, wherein the second configuration information is used for indicating a corresponding relationship between the QoS requirement of the service and/or the user subscription information and the licensed network and the unlicensed network.

Optionally, a mode for the terminal device to access the first network is a standalone mode or a non-standalone mode, wherein the standalone mode means that the terminal device implements a primary cell function and a secondary cell function on the unlicensed spectrum, and the non-standalone mode means that the terminal device implements the secondary cell function on the unlicensed spectrum.

Optionally, if the first information is the PDU session, the network device is a core network device, and the control information is specifically used for controlling the terminal device to perform the service flow offload in the licensed spectrum and the unlicensed spectrum for different PDU sessions.

Optionally, the core network device is an access and mobility management function (AMF) device or a user plane function (UPF) device, wherein the licensed spectrum and the unlicensed spectrum correspond to a same AMF device, and the licensed spectrum and the unlicensed spectrum correspond to different UPF devices.

Optionally, if the first information is the QoS flow, the network device is a core network device, and the control information is specifically used for controlling the terminal device to perform the service flow offload in the licensed spectrum and the unlicensed spectrum for different QoS flows in a same PDU session.

Optionally, the core network device is an AMF device, wherein the licensed spectrum and the unlicensed spectrum correspond to a same core network device.

Optionally, if the first information is a DRB, the network device is an access network device, and the mode for the terminal device to access the first network is a non-standalone mode, and the control information is specifically used for controlling the terminal device to perform the service flow offload in the licensed spectrum and the unlicensed spectrum for different DRBs.

Optionally, before the processing unit 410 determines the control information according to the first information, the communication unit 420 is further configured to receive first indication information sent by a core network device or the terminal device, wherein the first indication information indicates that a DRB for the terminal device is offloaded to the licensed spectrum and the unlicensed spectrum.

The processing unit 410 is specifically configured to determine the control information according to the first indication information.

Optionally, before the processing unit 410 determines the control information according to the first information, the communication unit 420 is further configured to receive second indication information sent by a core network device, wherein the second indication information indicates that a service is offloaded to the licensed spectrum and the unlicensed spectrum according to a 5G QoS identifier (5QI) or a QoS flow identifier (QFI).

The processing unit 410 is further configured to determine a constraint condition for distributing the DRB to the licensed spectrum and the unlicensed spectrum according to the second indication information.

The processing unit 410 is specifically configured to determine the control information according to the constraint condition.

It should be understood that the network device 400 may correspond to the network device in the method implementations and may implement corresponding operations implemented by the network device in the method implementations, and this will not be repeated here for sake of conciseness.

Figure 7:
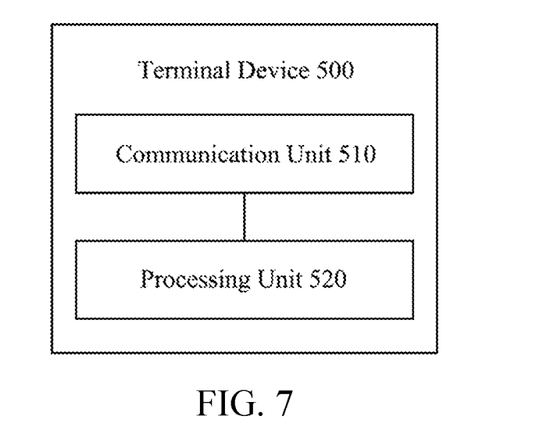
FIG. 7 is a schematic block diagram of a terminal device according to an implementation of the present disclosure.

FIG. 7 is a schematic block diagram of a terminal device 500 according to an implementation of the present disclosure. As shown in FIG. 7, the terminal device 500 is applied to a 5G communication system, and the terminal device 500 includes: a communication unit 510 and a processing unit 520.

The communication unit 510 is configured to receive control information sent by a network device and determined according to first information after the terminal device accesses a first network, wherein the control information is used for controlling the terminal device to perform service flow offload in a licensed spectrum and an unlicensed spectrum, the first network is a licensed network and/or an unlicensed network, and the first information is a packet data unit (PDU) session, a quality of service (QoS) flow, or a data radio bearer (DRB).

The processing unit 520 is configured to perform the service flow offload in the licensed spectrum and the unlicensed spectrum according to the control information.

Optionally, before the terminal device accesses the first network, the communication unit 510 is further configured to receive first configuration information sent by the network device, wherein the first configuration information is used for indicating priority information of the licensed network and the unlicensed network, and the priority information is used for the terminal device to select one from the licensed network and the unlicensed network to access.

The processing unit 520 is further configured to determine, according to the first configuration information, network identification information of a network that is needed to be accessed and/or system information of the network that is needed to be accessed for initial access, attachment and registration.

The processing unit 520 is further configured to access the first network according to the network identification information of the network that is needed to be accessed and/or the system information of the network that is needed to be accessed for initial access, attachment and registration.

Optionally, before the terminal device accesses the first network, the communication unit 510 is further configured to receive second configuration information sent by the network device, wherein the second configuration information is used for indicating a corresponding relationship between QoS requirement of a service and/or user subscription information and the licensed network and the unlicensed network.

The processing unit 520 is further configured to access the first network according to QoS requirement of a service that need be transmitted and/or the user subscription information, and the corresponding relationship between the QoS requirement of the service and/or the user subscription information and the licensed network and the unlicensed network.

Optionally, a mode for the terminal device to access the first network is a standalone mode or a non-standalone mode, wherein the standalone mode means that the terminal device implements a primary cell function and a secondary cell function on the unlicensed spectrum, and the non-standalone mode means that the terminal device implements the secondary cell function on the unlicensed spectrum.

Optionally, if the first information is the PDU session, the network device is a core network device, and the control information is specifically used for controlling the terminal device to perform the service flow offload in the licensed spectrum and the unlicensed spectrum for different PDU sessions.

The processing unit 520 is specifically configured to perform the service flow offload in the licensed spectrum and the unlicensed spectrum for different PDU sessions according to the control information.

Optionally, the core network device is an access and mobility management function (AMF) device or a user plane function (UPF) device, wherein the licensed spectrum and the unlicensed spectrum correspond to a same AMF device, and the licensed spectrum and the unlicensed spectrum correspond to different UPF devices.

Optionally, if the first information is the QoS flow, and the network device is a core network device, the control information is specifically used for controlling the terminal device to perform the service flow offload in the licensed spectrum and the unlicensed spectrum for different QoS flows in a same PDU session.

The processing unit 520 is specifically configured to perform the service flow offload in the licensed spectrum and the unlicensed spectrum for different QoS flows in a same PDU session according to the control information.

Optionally, the core network device is an AMF device, wherein the licensed spectrum and the unlicensed spectrum correspond to a same core network device.

Optionally, if the first information is a DRB, the network device is an access network device, and the mode for the terminal device to access the first network is a non-standalone mode, and the control information is specifically used for controlling the terminal device to perform the service flow offload in the licensed spectrum and the unlicensed spectrum for different DRBs.

The processing unit 520 is specifically configured to perform the service flow offload in the licensed spectrum and the unlicensed spectrum for different DRBs according to the control information.

It should be understood that the terminal device 500 may correspond to the terminal device in the method implementations and may implement corresponding operations implemented by the terminal device in the method implementations, and this will not be repeated here for sake of conciseness.

Figure 8:
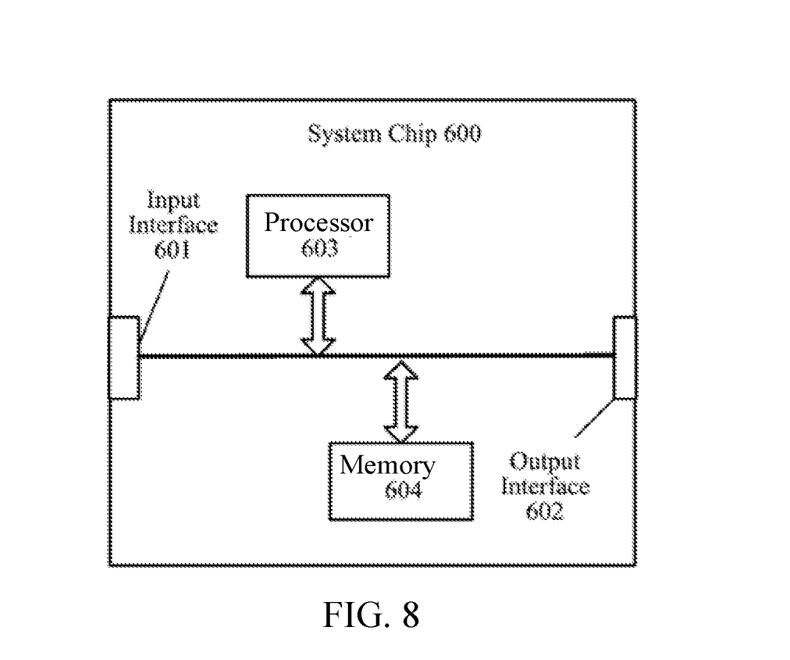
FIG. 8 shows a schematic block diagram of a device for service flow offload provided by an implementation of the present disclosure.

FIG. 8 is a schematic structural diagram of a system chip 600 according to an implementation of the present disclosure. The system chip 600 of FIG. 8 includes an input interface 601, an output interface 602, a processor 603, and a memory 604, which may be connected through internal communication connection lines. The processor 603 is used for executing codes in the memory 604.

Optionally, when the code is executed, the processor 603 implements the method implemented by the network device in the method implementations. For the sake of conciseness, it will not be repeated here.

Optionally, when the code is executed, the processor 603 implements the method implemented by the terminal device in the method implementations. For the sake of conciseness, it will not be repeated here.

Figure 9:
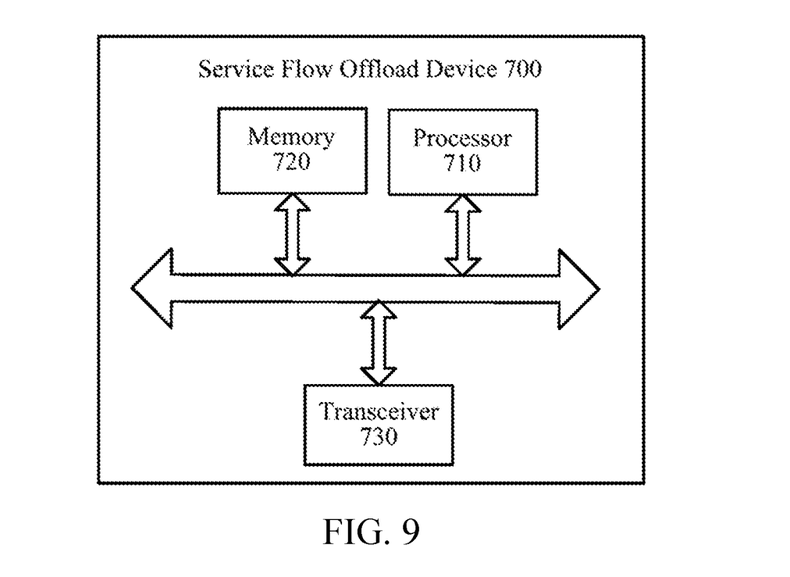
FIG. 9 is a schematic structural diagram of a system chip according to an implementation of the present disclosure.

FIG. 9 is a schematic block diagram of a device 700 for service flow offload according to an implementation of the present disclosure. As shown in FIG. 9, the communication device 700 includes a processor 710 and a memory 720. The memory 720 may store program codes, and the processor 710 may execute the program codes stored in the memory 720.

Optionally, as shown in FIG. 9, the communication device 700 may include a transceiver 730, and the processor 710 may control the transceiver 730 to communicate externally.

Optionally, the processor 710 may call the program codes stored in the memory 720 to perform corresponding operations of the network device in the method implementations, which will not be described here repeatedly for brevity.

Optionally, the processor 710 may call the program codes stored in the memory 720 to perform corresponding operations of the terminal device in the method implementations, which will not be described here repeatedly for brevity.

It should be understood that the processor in an implementation of the present disclosure may be an integrated circuit chip with a capability for processing signals. In the implementation process, the actions of the method implementations described above may be accomplished by integrated logic circuits of hardware in the processor or instructions in the form of software. The above processor may be a general purpose processor, a digital signal processor (DSP), an application specific integrated circuit (ASIC), a field programmable gate array (FPGA), or other programmable logic device, discrete gate or transistor logic device, or discrete hardware component. The processor may implement various methods, acts and logic block diagrams disclosed in implementations of the present disclosure. The general purpose processor may be a microprocessor, or the processor may be any conventional processor or the like. The actions of the method disclosed in connection with the implementations of the present disclosure may be directly embodied by the execution of the hardware decoding processor, or by the execution of a combination of hardware and software modules in the decoding processor. The software modules may be located in a storage medium commonly used in the art, such as a random access memory, flash memory, read-only memory, programmable read-only memory or electrically erasable programmable memory, or register. The storage medium is located in the memory, and the processor reads the information in the memory and completes the actions of the above method in combination with its hardware.

It should be understood that the memory in implementations of the present disclosure may be a transitory memory or non-transitory memory, or may include both transitory and non-transitory memories. The non-transitory memory may be a read-only memory (ROM), programmable ROM (PROM), an erasable programmable ROM (EPROM), an electrically erasable programmable ROM (EEPROM), or a flash memory. The transitory memory may be a random access memory (RAM) which serves as an external cache. As an example, but not as a limitation, many forms of RAMs are available, such as a static random access memory (SRAM), a dynamic random access memory (DRAM), a synchronous dynamic random access memory (SDRAM), a double data rate SDRAM (DDR SDRAM), an enhanced SDRAM (ESDRAM), a Synchlink DRAM (SLDRAM), and a Direct Rambus RAM (DR RAM). It should be noted that the memories of the systems and methods described herein are intended to include, but not limited to, these and any other suitable types of memories.

Those of ordinary skill in the art will recognize that the exemplary elements and algorithm acts described in combination with the implementations disclosed herein can be implemented in electronic hardware, or a combination of computer software and electronic hardware. Whether these functions are implemented in hardware or software depends on the specific application and design constraints of the technical solution. Skilled artisans may use different methods to implement the described functions in respect to each particular application, but such implementation should not be considered to be beyond the scope of the present disclosure.

Those skilled in the art may clearly understand that for convenience and conciseness of description, the specific working processes of the systems, apparatuses and units described above may refer to the corresponding processes in the method implementations and will not be described here.

In several implementations provided by the present disclosure, it should be understood that the disclosed systems, apparatuses and methods may be implemented in other ways. For example, the apparatus implementations described above are only illustrative, for example, the division of the units is only a logical function division, and there may be other division manners in actual implementation, for example, multiple units or components may be combined or integrated into another system, or some features may be ignored or not executed. On the other hand, the mutual coupling or direct coupling or communication connection shown or discussed may be indirect coupling or communication connection through some interface, apparatus or unit, and may be in electrical, mechanical or other forms.

The unit described as a separate component may or may not be physically separated, and the component shown as a unit may or may not be a physical unit, i.e., it may be located in one place or may be distributed over multiple network units. Some or all of the units may be selected according to actual needs to achieve the purpose of the implementations.

In addition, various functional units in various implementations of the present disclosure may be integrated in one processing unit, or the various units may be physically present separately, or two or more units may be integrated in one unit.

The functions may be stored in a computer readable storage medium if realized in a form of software functional units and sold or used as a separate product. Based on this understanding, the technical solution of the present disclosure, in essence, or the part contributing to the prior art, or the part of the technical solution, may be embodied in the form of a software product stored in a storage medium, including a number of instructions for causing a computer device (which may be a personal computer, a server, or a network device and the like) to perform all or part of the acts of the method described in various implementations of the present disclosure. The aforementioned storage medium includes various media capable of storing program codes, such as a U disk, a mobile hard disk, a read-only memory (ROM), a random access memory (RAM), a magnetic disk, or an optical disk.

What are described above are merely exemplary implementations of the present disclosure, but the protection scope of the present disclosure is not limited thereto. Any variation or substitution that may be easily conceived by a person skilled in the art within the technical scope disclosed by the present disclosure shall be included within the protection scope of the present disclosure. Therefore, the protection scope of the present disclosure shall be the protection scope defined by the claims.

What is claimed is:

1. A service flow offload method, applied to a 5G (fifth generation mobile communication technology) communication system, wherein the method comprises:
    receiving, by a terminal device, control information sent by a network device and determined by the network device according to first information after the terminal device accesses a first network, wherein the control information is used for controlling the terminal device to perform service flow offload in a licensed spectrum and an unlicensed spectrum, the first network is a licensed network or an unlicensed network, and the first information is a Packet Data Unit (PDU) session, a Quality of Service (QoS) flow, or a Data Radio Bearer (DRB); and
    performing, by the terminal device, the service flow offload in the licensed spectrum and the unlicensed spectrum according to the control information,
    wherein if the first information is the QoS flow, and the network device is a core network device, the control information is specifically used for controlling the terminal device to perform the service flow offload in the licensed spectrum and the unlicensed spectrum for different QoS flows, which are in a same PDU session;
    performing, by the terminal device, the service flow offload in the licensed spectrum and the unlicensed spectrum according to the control information comprises:
    performing, by the terminal device, the service flow offload in the licensed spectrum and the unlicensed spectrum for different QoS flows in a same PDU session according to the control information.

2. The method according to claim 1, wherein before the terminal device accesses the first network, the method further comprises:
    receiving, by the terminal device, first configuration information sent by the network device, wherein the first configuration information is used for indicating priority information of the licensed network and the unlicensed network, and the priority information is used for the terminal device to select one from the licensed network and the unlicensed network to access;
    determining, by the terminal device, according to the first configuration information, at least one of network identification information of a network that is needed to be accessed or system information of the network, that is needed to be accessed for initial access, attachment and registration; and
    accessing, by the terminal device, the first network according to at least one of the network identification information of the network that is needed to be accessed or the system information of the network that is needed to be accessed for initial access, attachment and registration.

3. The method according to claim 1, wherein before the terminal device accesses the first network, the method further comprises:
    receiving, by the terminal device, second configuration information sent by the network device, wherein the second configuration information is used for indicating a corresponding relationship between at least one of QoS requirement of a service or user subscription information and the licensed network and the unlicensed network; and
    accessing, by the terminal device, the first network according to at least one of QoS requirement of a service that need be transmitted or the user subscription information, and the corresponding relationship between at least one of the QoS requirement of the service or the user subscription information and the licensed network and the unlicensed network.

4. The method according to claim 1, wherein a mode for the terminal device to access the first network is a standalone mode or a non-standalone mode, wherein the standalone mode means that the terminal device implements a primary cell function and a secondary cell function on the unlicensed spectrum, and the non-standalone mode means that the terminal device implements the secondary cell function on the unlicensed spectrum.

5. The method according to claim 1, wherein if the first information is the PDU session, and the network device is a core network device, the control information is specifically used for controlling the terminal device to perform the service flow offload in the licensed spectrum and the unlicensed spectrum for different PDU sessions;
    performing, by the terminal device, the service flow offload in the licensed spectrum and the unlicensed spectrum according to the control information comprises:

performing, by the terminal device, the service flow offload in the licensed spectrum and the unlicensed spectrum for different PDU sessions according to the control information.

6. The method according to claim 5, wherein the core network device is an access and mobility management function (AMF) device or a user plane function (UPF) device, wherein the licensed spectrum and the unlicensed spectrum correspond to a same AMF device, and the licensed spectrum and the unlicensed spectrum correspond to different UPF devices.

7. The method according to claim 1, wherein the core network device is an AMF device, wherein the licensed spectrum and the unlicensed spectrum correspond to a same core network device.

8. The method according to claim 1, wherein if the first information is a DRB, and the network device is an access network device, the mode for the terminal device to access the first network is a non-standalone mode, and the control information is specifically used for controlling the terminal device to perform the service flow offload in the licensed spectrum and the unlicensed spectrum for different DRBs;
performing, by the terminal device, the service flow offload in the licensed spectrum and the unlicensed spectrum according to the control information comprises:
performing, by the terminal device, the service flow offload in the licensed spectrum and the unlicensed spectrum for different DRBs according to the control information.

9. A network device, applied to a 5G (fifth generation mobile communication technology) communication system, wherein the network device comprises a processor, a memory, and a communication interface, wherein the processor is connected with the memory and the communication interface, the memory is configured for storing instructions, and the processor is configured for executing the instructions, and the communication interface is configured for communicating with other network elements under the control of the processor; wherein the processor is configured for executing the instructions to:
determine control information according to first information after a terminal device accesses a first network, wherein the control information is used for controlling the terminal device to perform service flow offload in a licensed spectrum and an unlicensed spectrum, the first network is a licensed network or an unlicensed network, and the first information is a Packet Data Unit (PDU) session, a Quality of Service (QoS) flow, or a Data Radio Bearer (DRB); and
send, through the communication interface, the control information to the terminal device, wherein if the first information is the QoS flow, and the network device is a core network device, the control information is specifically used for controlling the terminal device to perform the service flow offload in the licensed spectrum and the unlicensed spectrum for different QoS flows in a same PDU session.

10. The network device according to claim 9, wherein the processor is configured for executing the instructions to: before the terminal device accesses the first network, send first configuration information to the terminal device, wherein the first configuration information is used for indicating priority information of the licensed network and the unlicensed network, and the priority information is used for the terminal device to select one from the licensed network and the unlicensed network to access.

11. A terminal device, applied to a 5G (fifth generation mobile communication technology) communication system, wherein the terminal device comprises a processor, a memory, and a communication interface, wherein the processor is connected with the memory and the communication interface, the memory is configured for storing instructions, and the processor is configured for executing the instructions, and the communication interface is configured for communicating with other network elements under the control of the processor; wherein the processor is configured for executing the instructions to:
receive, through the communication interface, control information sent by a network device and determined by the network device according to first information after the terminal device accesses a first network, wherein the control information is used for controlling the terminal device to perform service flow offload in a licensed spectrum and an unlicensed spectrum, the first network is a licensed network or an unlicensed network, and the first information is a Packet Data Unit (PDU) session, a Quality of Service (QoS) flow, or a Data Radio Bearer (DRB); and
perform the service flow offload in the licensed spectrum and the unlicensed spectrum according to the control information, wherein if the first information is the QoS flow, and the network device is a core network device, the control information is specifically used for controlling the terminal device to perform the service flow offload in the licensed spectrum and the unlicensed spectrum for different QoS flows in a same PDU session; and
the processor is configured for executing the instructions to perform the service flow offload in the licensed spectrum and the unlicensed spectrum for different QoS flows in a same PDU session according to the control information.

12. The terminal device according to claim 11, wherein the processor is configured for executing the instructions to:
before the terminal device accesses the first network, receive first configuration information sent by the network device, wherein the first configuration information is used for indicating priority information of access that the terminal device selects in the licensed network and the unlicensed network;
determine, according to the first configuration information, at least one of network identification information of a network that is needed to be accessed or system information of the network that is needed to be accessed for initial access, attachment and registration; and
access the first network according to at least one of the network identification information of the network that is needed to be accessed or the system information of the network that is needed to be accessed for initial access, attachment and registration.

13. The terminal device according to claim 11, wherein the processor is configured for executing the instructions to:
before the terminal device accesses the first network, receive second configuration information sent by the network device, wherein the second configuration information is used for indicating a corresponding relationship between at least one of QoS requirement of a service or user subscription information and the licensed network and the unlicensed network; and
access the first network according to at least one of QoS requirement of a service that needs be transmitted or the user subscription information, and the corresponding relationship between at least one of the QoS requirement of the service or the user subscription information and the licensed network and the unlicensed network.

14. The terminal device according to claim 11, wherein a mode for the terminal device to access the first network is a standalone mode or a non-standalone mode, wherein the standalone mode means that the terminal device implements a primary cell function and a secondary cell function on the unlicensed spectrum, and the non-standalone mode means that the terminal device implements the secondary cell function on the unlicensed spectrum.

15. The terminal device according to claim 11, wherein if the first information is the PDU session, and the network device is a core network device, the control information is specifically used for controlling the terminal device to perform the service flow offload in the licensed spectrum and the unlicensed spectrum for different PDU sessions; and
the processor is configured for executing the instructions to: perform the service flow offload in the licensed spectrum and the unlicensed spectrum for different PDU sessions according to the control information.

16. The terminal device according to claim 15, wherein the core network device is an access and mobility management function (AMF) device or a user plane function (UPF) device, wherein the licensed spectrum and the unlicensed spectrum correspond to a same AMF device, and the licensed spectrum and the unlicensed spectrum correspond to different UPF devices.

17. The terminal device according to claim 11, wherein the core network device is an AMF device, wherein the licensed spectrum and the unlicensed spectrum correspond to a same core network device.

18. The terminal device according to claim 11, wherein if the first information is a DRB, and the network device is an access network device, the mode for the terminal device to access the first network is a non-standalone mode, and the control information is specifically used for controlling the terminal device to perform the service flow offload in the licensed spectrum and the unlicensed spectrum for different DRBs; and
the processor is configured for executing the instructions to: perform the service flow offload in the licensed spectrum and the unlicensed spectrum for different DRBs according to the control information.

* * * * *